UNITED STATES PATENT OFFICE.

DITTMAR FINKLER, OF BONN, GERMANY.

PROCESS OF RENDERING BRAN DIGESTIBLE.

953,946.  Specification of Letters Patent.  Patented Apr. 5, 1910.

No Drawing.  Application filed June 22, 1906. Serial No. 322,928.

*To all whom it may concern:*

Be it known that I, DITTMAR FINKLER, a subject of the King of Prussia, residing at Bonn-on-the-Rhine, Germany, (whose post-office address is 10 Wörthstrasse, in said Bonn-on-the-Rhine, Germany,) have invented certain new and useful Improvements in Processes of Rendering Bran Digestible; and I do hereby declare the following to be a full, clear, and exact description of the invention, such as will enable others skilled in the art to which it appertains to make and use the same.

This invention relates to a method of completely utilizing the nutrients of the bran or covering walls of cereals, legumes and other seed and vegetable substances, and has for its object to render said nutrients entirely digestible.

Hitherto it was not possible to make the nutrients of the bran of cereals and legumes susceptible of digestion and absorption, and the proposals to employ the whole of the grain for making bread have proved unsuccessful from a digestive standpoint. Requisite researches have yielded the counter-proposal to only use the finest flour from which the bran, which constitutes about 25% of the total flour is entirely removed.

It has been found that ordinary rye or wheat-flour is the better utilized, the less bran it contains; that the rye or wheat-bran is not a suitable nutrient for the human organism. I have discovered, however, that it is possible to make the entire nutrient of rye or wheat or other vegetable susceptible of digestion. I found that the nutritive substance of bran, that is the gluten cells, are not in themselves indigestible, but resist digestion, because the cell walls are not attacked by the digesting fluid. Hence they hold the nutrients inclosed by them at a distance from the digestive action.

The present invention consists in a process by which the total nutrients of the bran or covering of fruits or cereals and legumes, or other vegetable matter are made susceptible of digestion by liberating the nutrients from their containing cell-walls.

I carry out my invention by disintegrating or opening the cell walls in different ways preparatory to or during the act of grinding for instance in the following manner: I first separate the bran or other inclosure from the kernel of the seed. The bran is then impregnated with a sodium chlorid solution, and disintegrated by bruising, grinding, or beating in such a way that the gluten cell walls burst open and are emptied of their contents.

I have found that good results are obtained, if bran is mixed with a 10% solution of sodium chlorid in water and left to stand for a time. Of course, a weaker solution than 10% may be used. The mixture is ground to a fine paste, until the cells are broken, the albumen liberated and the whole matter further and thoroughly ground. The ground material may be further washed if desired. Then the mass may be dried and if necessary ground again. In this way especially at low temperature, none of the nutrients is dissolved, or lost. The opening of the bran cells may also be obtained preparatory to or while grinding, by appropriate lyes or solutions of other salts or dilute acids, or several of those equivalents of salt, one of which is lime. The bursting open of the cells and the liberation of the cell-contents can be assisted by employing a correspondingly great temperature difference, as by freezing and then grinding.

Flour obtained by my process possesses in a digestive condition all the nutritive ingredients necessary for sustaining animal life. Bran which heretofore was a comparatively valueless by-product, is rendered as valuable as ordinary good flour. When I mention bran in this specification and in the claims, I mean the bran of cereals or the corresponding covering of seeds and vegetable food substances.

I claim as my invention:

1. The process of increasing the digestibility of the bran of cereals by comminuting it in the presence of a solution of sodium chlorid, the comminuting process being continued until the cell walls of the bran are broken.

2. The process of increasing the digestibility of the bran of cereals by comminuting it in the presence of a solution of sodium chlorid and lime, the comminuting process being continued until the cell walls of the bran are broken.

In testimony that I claim the foregoing as my invention, I have signed my name in presence of two subscribing witnesses.

DITTMAR FINKLER

Witnesses:
 BESSIE F. DUNLAP,
 LOUIS VANDORN.